(12) United States Patent
Durham et al.

(10) Patent No.: US 7,583,000 B2
(45) Date of Patent: Sep. 1, 2009

(54) STARTING SYSTEM FOR SALIENT-POLED-ROTOR ELECTRIC MOTOR

(75) Inventors: Gary L. Durham, Stuart, FL (US); Harold S. Durham, Stuart, FL (US)

(73) Assignee: Tri-Seven Research, Inc., Wichita, KS (US)

( * ) Notice: Subject to any disclaimer, the term of this patent is extended or adjusted under 35 U.S.C. 154(b) by 327 days.

(21) Appl. No.: 11/500,559

(22) Filed: Aug. 8, 2006

(65) Prior Publication Data

US 2006/0273681 A1    Dec. 7, 2006

Related U.S. Application Data

(63) Continuation-in-part of application No. 10/315,845, filed on Dec. 10, 2002, now Pat. No. 7,276,831.

(51) Int. Cl.
  *H02K 1/00* (2006.01)
(52) U.S. Cl. .................................. 310/180; 310/179
(58) Field of Classification Search ......... 310/165–167, 310/179–184, 254, 269; 318/245, 701
  See application file for complete search history.

(56) References Cited

U.S. PATENT DOCUMENTS

| 2,610,312 | A |   | 9/1952  | Seay          |         |
|-----------|---|---|---------|---------------|---------|
| 2,802,123 | A |   | 8/1957  | Tweedy et al. |         |
| 3,422,292 | A |   | 1/1969  | Port et al.   |         |
| 3,629,626 | A | * | 12/1971 | Abbott        | 310/49 R |
| 4,029,977 | A | * | 6/1977  | Chai et al.   | 310/49 R |
| 4,038,575 | A |   | 7/1977  | Nordebo       |         |
| 4,401,939 | A | * | 8/1983  | Korbell       | 322/59  |

(Continued)

FOREIGN PATENT DOCUMENTS

JP    01081648 A    3/1989

(Continued)

*Primary Examiner*—Thanh Lam
(74) *Attorney, Agent, or Firm*—Young Basile Hanlon & MacFarlane, P.C.

(57) ABSTRACT

A starting system and method for starting a salient-poled-rotor electric motor having a stator with a plurality of spaced salient poles, a plurality of field coils of unchanging polarity, and a plurality of armature coils, wherein each field coil of the plurality of field coils at least partially overlaps an armature coil of the plurality of armature coils, and wherein variable excitement of the armature coils alternately creates a magnetic pole force in every other pole of the plurality of spaced salient poles of the stator. In such motors, the stator has a first position, wherein the rotor is in stasis with respect to the stator and torque between the rotor and the stator is substantially minimized, and a second position, wherein torque between the rotor and the stator is substantially maximized. A drive circuit provides current to the field coils and the armature coils. A start circuit is provided for regulating the drive circuit to vibrate the rotor to the second position. A current source is connectable to the drive circuit for variably exciting the armature coils to produce substantially continuous rotation of the rotor. A switch is provided for electrically engaging the start circuit with the drive circuit while the rotor moves from the first position to the second position, and for electrically engaging the current source with the drive circuit when the rotor reaches the second position.

23 Claims, 12 Drawing Sheets

U.S. PATENT DOCUMENTS

| | | | |
|---|---|---|---|
| 5,459,385 A * | 10/1995 | Lipo et al. | 318/701 |
| 5,545,938 A * | 8/1996 | Mecrow | 310/156.64 |
| 5,672,925 A * | 9/1997 | Lipo et al. | 310/154.11 |
| 5,717,269 A * | 2/1998 | Tang | 310/168 |
| 5,923,142 A * | 7/1999 | Li | 318/701 |
| 6,075,302 A | 6/2000 | McCleer | |
| 6,150,776 A | 11/2000 | Potter et al. | |
| 6,787,958 B1 | 9/2004 | Walter | |

FOREIGN PATENT DOCUMENTS

| | | |
|---|---|---|
| WO | WO 01/03272 A1 | 1/2001 |

* cited by examiner

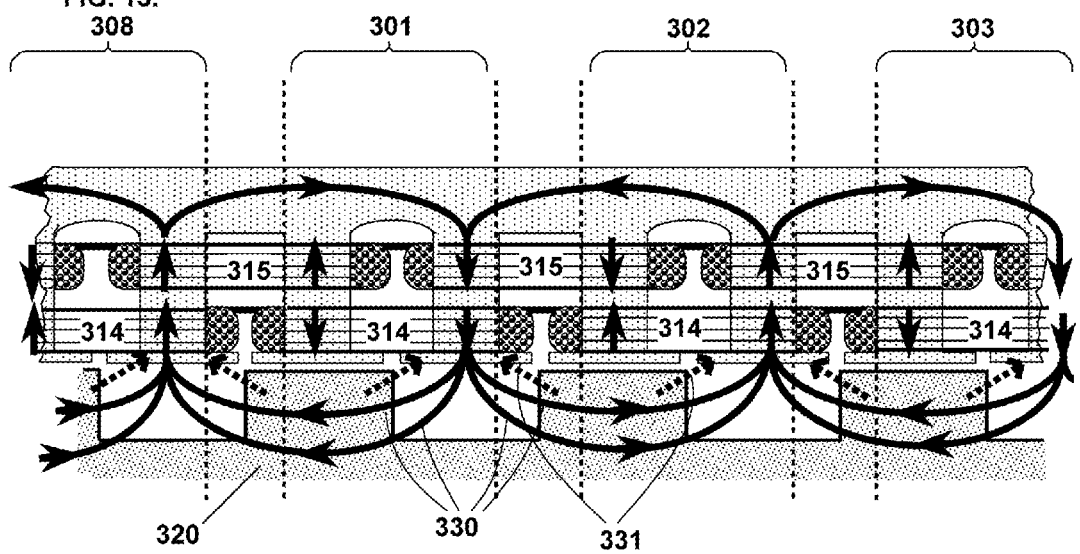
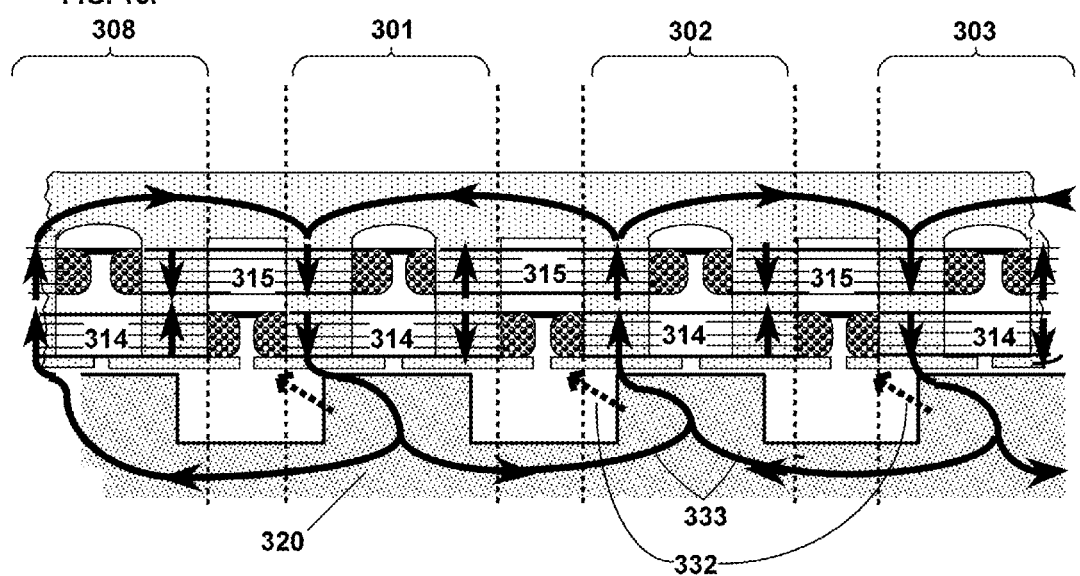

and method for starting a salient-poled-rotor electric motor

STARTING SYSTEM FOR SALIENT-POLED-ROTOR ELECTRIC MOTOR

CROSS REFERENCE TO RELATED APPLICATIONS

This application is a continuation-in-part of U.S. patent application Ser. No. 10/315,845, filed Dec. 10, 2002 now U.S. Pat. No. 7,276,831.

FIELD OF THE INVENTION

The invention relates to the field of electric motors having a plurality of magnetic poles wherein the poles are alternately polarized and neutralized to produce rotation of a rotor, and more particularly, the present invention relates to salient-poled-rotor electric motors which have no coils or inductor bands on the rotor. The present invention further relates to start positioning systems for providing maximum starting torque for start-under-load conditions for such motors.

BACKGROUND OF THE INVENTION

In electric motors which have no coils or induction bands, successfully starting the motor under heavy loads can present some unique challenges. In the particular class of electric motors discussed herein, referred to herein as salient-poled-rotor electric motors, rotor torque is created by alternately creating a magnetic pole force in every other pole of the stator. For any three poles of the stator, the stator poles will alternate between a first state, wherein a pole force is exerted upon the rotor by the inner stator pole, but not by the outer two stator poles, and a second state, wherein a pole force is exerted upon the rotor by the outer two stator poles, but not by the inner stator pole. In such motors, the available torque between the rotor and the stator fluctuates between a minimum torque position, which nearly cancels all start torque, and a maximum torque position, which provides the greatest start torque, as each rotor pole moves in and out of register with respective stator poles. Thus, in developing starting torque, the position of the salient poles of the rotor in relation to the stator poles is the critical factor. The maximum torque position for the motor is to have the salient pole faces of the rotor positioned center of the stator pole slots, which places the face of each rotor pole halfway between two stator poles. In this position, each rotor pole face is half in register with one stator pole face and half in register with an adjacent stator pole face. The minimum torque position occurs where the rotor pole faces are all in register with a respective stator pole.

The cancellation of start torque in the minimum torque position is created by magnetic flux from the stator poles from which the rotor poles are not in register. Thus, the stator poles to the right and to the left of any rotor pole both exert an attractive force on the rotor pole which is in register with the stator pole between them. The result is that the attractive forces that would otherwise induce the rotor to move are canceled by one another. In this balanced condition, there is near equal force to induce clockwise rotation as there is force to induce counter-clockwise rotation. The result is often only a vibrating rotor unable to achieve enough torque to move against the load.

One known salient-poled-rotor electric motor is described in U.S. Pat. No. 6,787,958 to Walter, which is referred to herein as the Walter Motor. The Walter Motor attempts to provide adequate starting torque by using shaped rotor poles. In particular, one side of each rotor pole is slanted outward from the pole face to the pole root, thereby creating an asymmetrical registration between the rotor pole and the corresponding stator pole. Although this creates a slight unbalancing of the attractive magnetic forces when the rotor poles are fully registered with the stator poles, the neutral position has only been moved, not eliminated. Thus, the start torque minimum position appears when the rotor poles are slightly out of register with one set of the stator poles. Accordingly, this type of shaped pole motor is essentially mono-directional, because it creates poor starting torque and poor running characteristics in the direction of rotation opposite the direction in which the poles are slanted. Even at its best, the pole shaping method used by Walters provides poor starting torque characteristics in applications where the motor is started under load.

In salient poled rotor electric motors that utilize a control circuit having feedback sensors, the control circuit is sometimes able to start the motor on its own. This is particularly true where there is little or no starting load, as in fan applications. However, if the motor must be started under heavy load, previously known control circuits will not be able to start the motor if the rotor has stopped in the minimum torque position. Thus, if the motor is to be started under load, a positioning system must be provided for moving the rotor to the maximum torque position against the load before attempting to start the motor.

It would be desirable to energize the coils of the stator of salient-poled rotor electric motors to create a very strong positioning torque on the rotor poles which tends to center the rotor poles in the maximum torque position and can be controlled in such a way that the amount of positioning torque can be great or small depending on the starting load. It would also be desirable to have a start positioning system for salient-poled rotor electric motors which use an H-bridge circuit, and for salient-poled rotor electric motors which use a bifilar circuit. It would further be desirable to have a start positioning system that can be used with salient-poled rotor electric motors which run synchronously on alternating current without a run-circuit, wherein the start positioning system serves as the starting circuit for the motor to accelerate the rotor from stasis to synchronous operation against a load.

SUMMARY OF THE INVENTION

The present invention further provides a starting system having a stator with a plurality of spaced salient poles, a plurality of field coils of unchanging polarity, and a plurality of armature coils, wherein each field coil of the plurality of field coils at least partially overlaps an armature coil of the plurality of armature coils, and wherein variable excitement of the armature coils alternately creates a magnetic pole force in every other pole of the plurality of spaced salient poles of the stator. In such motors, the stator has a first position, wherein the rotor is in stasis with respect to the stator and torque between the rotor and the stator is substantially minimized, and a second position, wherein torque between the rotor and the stator is substantially maximized. A drive circuit provides current to the field coils and the armature coils. A start circuit is provided for regulating the drive circuit to vibrate the rotor to the second position. A current source is connectable to the drive circuit for variably exciting the armature coils to produce substantially continuous rotation of the rotor. A switch is provided for electrically engaging the start circuit with the drive circuit while the rotor moves from the first position to the second position, and for electrically engaging the current source with the drive circuit when the rotor reaches the second position.

In order to generate a series of pulses to regulate the drive circuit, the system and method may provide an adjustable square wave generator. Furthermore, although other drive circuits may be used, it is specifically contemplated that the drive circuit may be an H-bridge type drive circuit or a bifilar type drive circuit.

The start circuit may have a rotor position sensor for sensing a first condition of the rotor and a second condition of the rotor, and a triac electrically connected to the position sensor for generating a series of pulses to regulate the drive circuit, wherein the series of pulses is formed from the positive half phase of an alternating current source in response to the first condition of the rotor, and the series of pulses is formed from the negative half-phase of the alternating current source in response to the second condition of the rotor.

BRIEF DESCRIPTION OF THE DRAWINGS

The description herein makes reference to the accompanying drawings wherein like referenced numerals refer to like parts throughout the several views and wherein:

FIGS. 7 and 8 illustrate how the fields of the DC coils interact with the fields of the AC coils, wherein FIG. 7 illustrates the positive electrical half phase, and FIG. 8 illustrates the negative electrical half phase;

FIG. 15 is an illustration of the Split-Pole Field-Match motor wherein the rotor is in the minimum starting torque position;

FIG. 16 is an illustration of the Split-Pole Field-Match motor wherein the rotor is in the maximum starting torque position;

DETAILED DESCRIPTION OF THE INVENTION

Figure 1:
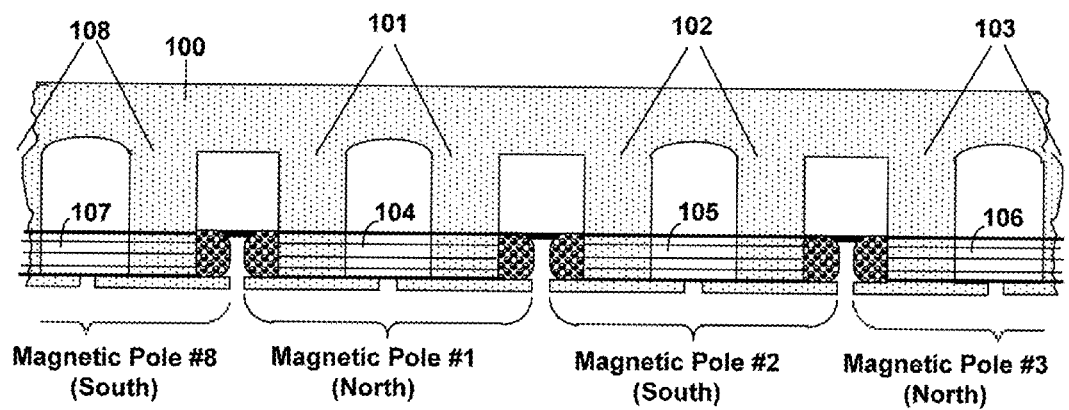
FIG. 1 is a partial schematic view of a motor stator in accord with the invention illustrating the direct current coils, only, being wound upon adjacent sets.

Referring to the drawings, the present invention will now be described in detail with reference to the disclosed embodiment.

In this disclosure, the effect of the invention will be called the Field-Match effect. The reason for the use of the word "match" is that it has two near opposite meanings: one which means "to agree, to be alike" (which we will designate "match[1]") and another meaning which means "to oppose", as in a "football match" (which we will designate "match[2]"). The torque produced by the stator on the rotor of the Split-Pole Field-Match Motor is caused by a unique design in which two coil fields of near equal value are matched on a single stator pole, alternately, in both senses of the word "match".

First, they are "matched[1]" in one part of the electrical phase as like-fields on the same pole which series and causes the pole to exert a magnetomechanical force on a laminated, ferrite, salient poled rotor; then the coils are "matched[2]" as opposing fields on the same pole in the opposite part of the electrical phase and the opposing magnetomotive forces exerted on the pole cause there to be no magnetomechanical force exerted on the ferrite rotor as no flux is manifested from the pole.

The Split-Pole Field-Match Motor uses this concept to integrate all the active magnetic components of a motor into the stator which interacts with a laminated salient pole rotor in a smooth and efficient way which makes it unnecessary to use an induction rotor. This makes the stator-rotor configuration look much like that of a variable reluctance motor. However, the split-pole field-match system used in the stator of this motor to cause torque on the rotor creates the torque in a very different manner from that of any variable reluctance motor now in use, and this distinction will be easily appreciated from the following description. The Split-Pole Field-Match motor integrates direct current (DC) coils and alternating current (AC) coils on the stator in an overlap configuration to create field concentrations on alternate sets of half-poles on the stator. The split-pole field-match system can produce motors whose operation requires only a single-phase system and produces competitive results equal to motors which require the controller to provide multi-phase operation, thus making the use of less expensive controllers for the same result possible.

FIG. 1 is a diagrammatic view of a portion of the Split-Pole Field-Match Motor stator 100, which, in its entirety, would be an eight (8) pole stator, in which only the DC stator coils 104, 105, 106, 107 are shown wrapped around the split poles 101 and 102 (fully shown) and 103 and 108 (partially shown). As illustrated, split-pole 101 is designated as magnetic-pole #1 and will always have a north field being induced into both halves of the pole by the DC coil 104. This means that the two salient protrusions which make up the two halves of split-pole 101 form a single magnetic pole which will always have a north field on the face of one of its halves. Split pole 102 is designated as magnetic-pole #2 and always has a south field being induced into both halves of the pole by the DC coil 105. This means that the two salient protrusions which make up the two halves of split-pole 102 form a single magnetic pole which will always have a south field on the face of one of its halves. The description for split-pole 103, which is designated magnetic-pole #3, is otherwise the same as that for split-pole 101 except that its DC field is obviously induced by DC coil 106. This pattern of north, south, north, south magnetic split-poles continues all around the inside circumference of the stator until it completes the stator split-poles at split-pole 108 which is next to split-pole 101 and is designated as magnetic pole #8 which always has a south field on one of its halves. It can also be observed from FIG. 1 that the halves of each split-pole are spaced apart so that the space used to split the various poles is equal to the space between each of the magnetic poles 1, 2, 3, etc. Thus, all half-poles are the same distance from its other half as it is from the nearest half of any split-pole adjacent to it around the inner circumference of the stator.

Figure 2:
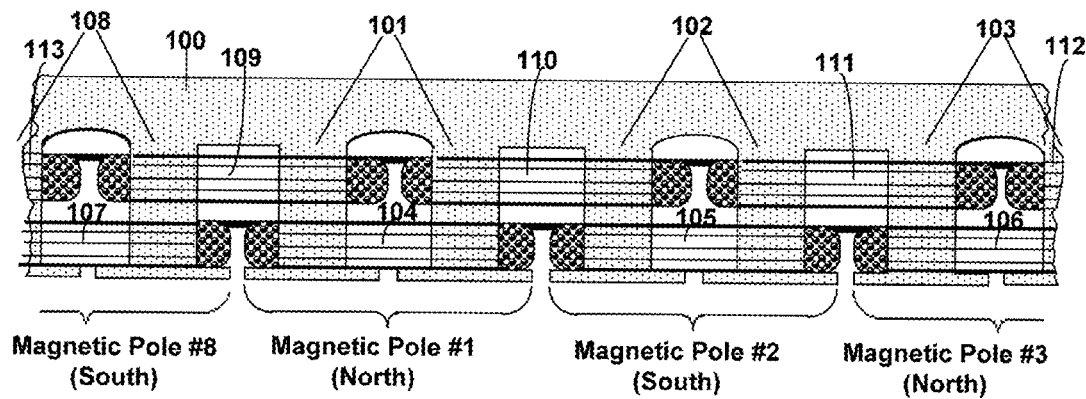
FIG. 2 is a partial schematic view similar to FIG. 1 illustrating the alternating current coils wound upon the appropriate poles of the stator.

In FIG. 2, the AC coils of the stator are shown added to the same portion of the stator as in FIG. 1. As is illustrated, the AC stator coils 109, 110, 111, 112, and 113 are shown wrapped through the split of two different poles so that the AC coils are wrapped on a right half-pole and a left half-pole of two adjacent split-poles which together, will make up that AC coil's ferrite core. Thus, the AC stator coil 109 is wrapped around the right half-pole of the split-pole 108 and the left half-pole of the split-pole 101, and the AC stator coil 110 is wrapped around the right half-pole of the split-pole 101 and the left half-pole of the split-pole 102, etc. This means that each AC coil is wrapped so that its ferrite core is made up of two half-poles from two different split-poles which have two different DC fields being induced into them and thus, one of the half-poles of its core has a south field induced into by its DC coil and the other adjacent half-pole has a north field induced into it from its DC coil.

Thus, it can be understood that as the AC coils alternate between the positive and negative portions of the electrical phase, it will always match one of the half-poles magnetically as defined by "matched[1]" earlier in this disclosure and match the other half-pole magnetically as defined by "matched[2]" earlier in this disclosure. Thus, in each half of the electrical phase, it will always magnetically series with the DC coil on one of the split-poles causing magnetic flux to be induced into that half-pole which will cause a magnetomechanical force to be set up between that half-pole and a ferrite pole of the rotor and it will at the same time, magnetically oppose the DC coil on the other adjacent half-pole which makes up its core, thus inducing an equal and opposing magnetomotive force in that half-pole and causing it to manifest no flux and thus not to cause a magnetomechanical force to be set up between that half-pole and a ferrite pole of the rotor. In the next electrical half-phase, the AC coils will reverse their field and the opposite effect will occur where they will now series with the half-pole and DC coil it formerly opposed and will also oppose the other half-pole and DC coil with which it formerly went into series.

The AC coils are alternately wrapped so that each AC coil produces the opposite magnetic field from the AC coil either to the right or left of it. This will insure that a magnetic pattern of flux will be created in which, for one electrical half-phase, every other half-pole, one in each split-pole (e.g., the ones on the left) will manifest magnetomechanical force on the rotor while the other set, i.e., the ones on the right, will not. In the next opposite electrical half-phase, the half-poles on the right will manifest magnetomechanical force on the rotor while the former set of half-poles, the ones on the left, will not. This is illustrated in FIGS. 3 and 4.

Figure 3:
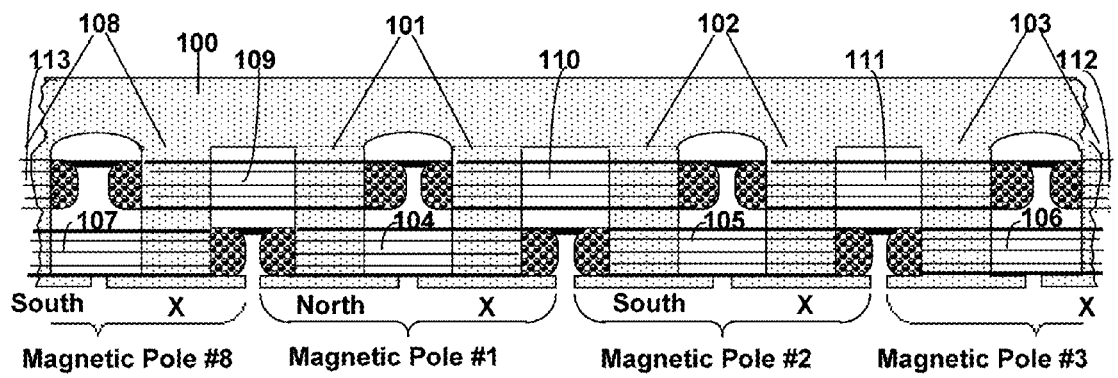
FIG. 3 is similar to FIG. 2 and illustrates the polarity and neutrality of adjacent poles and sets.
Figure 4:
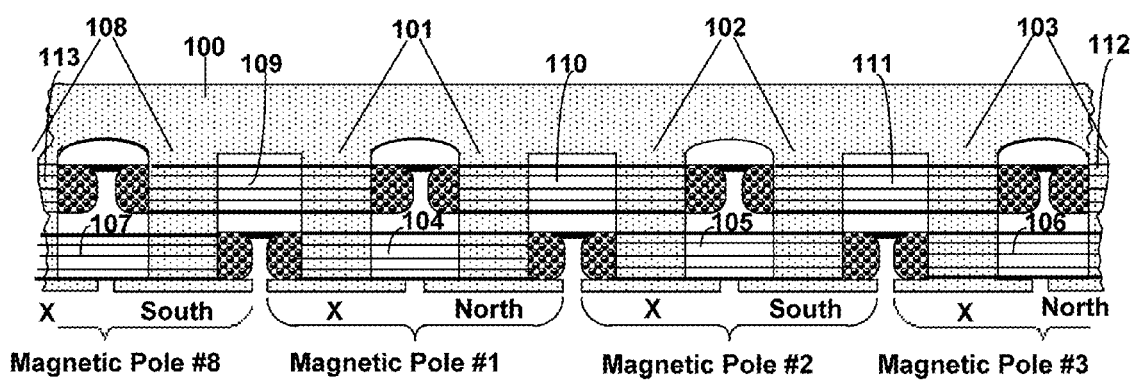
FIG. 4 is similar to FIG. 3 illustrating the polarity and neutrality of adjacent poles during the opposite cycle with respect to FIG. 3.
Figure 5:
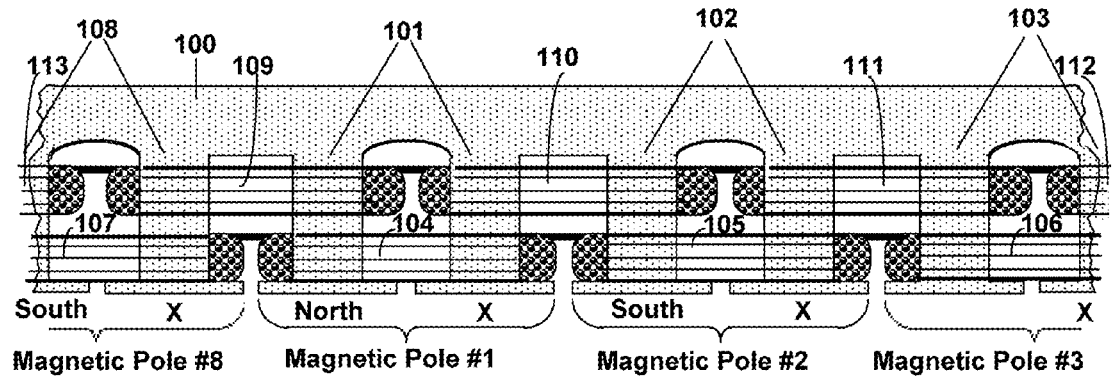
FIG. 5 is similar to FIG. 3 illustrating the polarity and neutrality of adjacent poles after the cycle illustrated in FIG. 4.

In FIG. 3, an "X" is placed below each right-hand half-pole of the split poles 101, 102, 103 and 108. This is to indicate that there is no field being produced in these half-poles because the AC coils on those half-poles are out of phase with the DC coils on those half-poles during the electrical half-phase. Thus, no field is manifested. At the same time, the left-hand half of each split-pole 101, 102, 103, and 108 shows either a north or a south below it indicating that a field is being induced by the AC coils into those half-poles, which is in phase with the DC coils of those split-poles, thus field is manifested. In FIG. 4, the next opposite electrical half-phase is shown and the left-hand half-poles of each split-pole now has an "X" to indicate that the AC coils have reversed their field and are now out of phase with the DC coils on those left-hand half-poles. At the same time, the right-hand half of each split-pole 101, 102, 103 and 108 shows either a north or a south below it indicating that a field is being induced by the AC coils into those half-poles which is in phase with the DC coils of those split-poles. Thus, field is manifested. FIG. 5 illustrates a return of the AC coils to the first electrical half-phase as in FIG. 3, and the result is that the magnetic pattern returns to the same as in FIG. 3, thus causing an alternating, repeating pattern of field manifestation from the half-poles of each split-pole.

Figure 6:
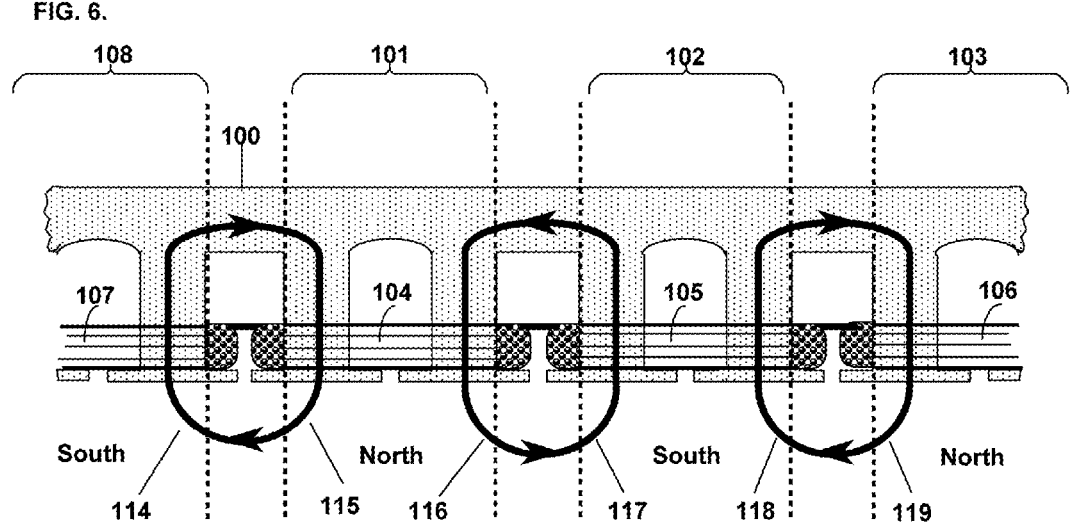
FIG. 6 is a schematic depiction of the field flow in adjacent poles only due to the direct current coils.
Figure 7:
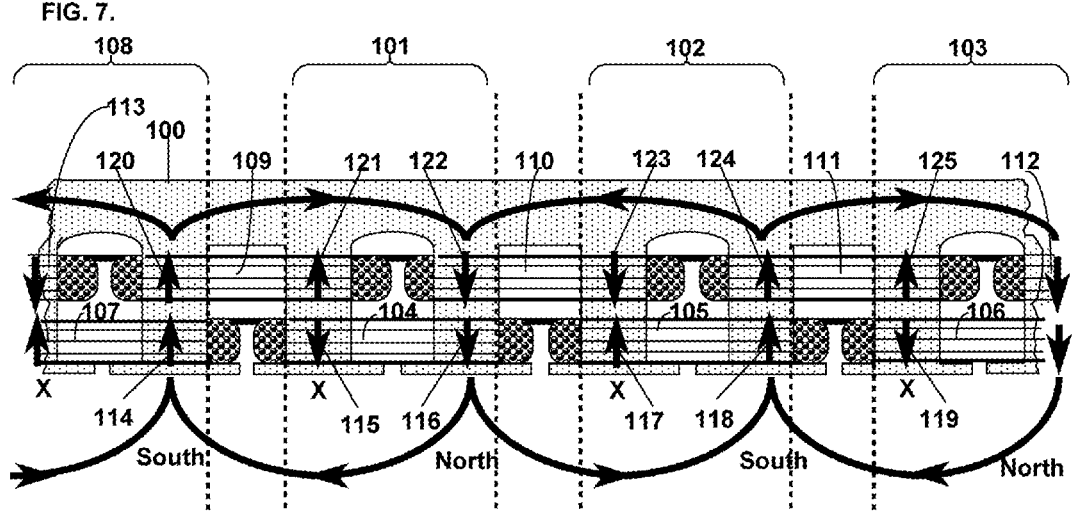
Figure 8:
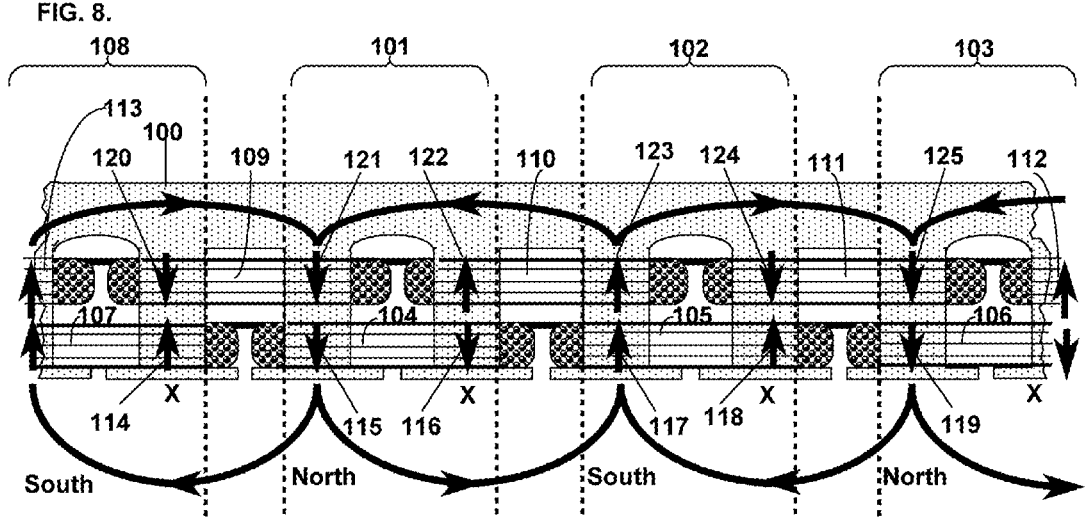

FIG. 6 is a diagrammatic depiction of the field flow in the stator due only to the DC coils. As can be seen, this creates north and south domains in the stator which will always be north or south unless opposed by the field of an AC coil. FIGS. 7 and 8 show how the fields of the DC coils interact with the AC coils, with FIG. 7 being the positive electrical half-phase and FIG. 8 being the negative electrical half-phase.

Figure 9:
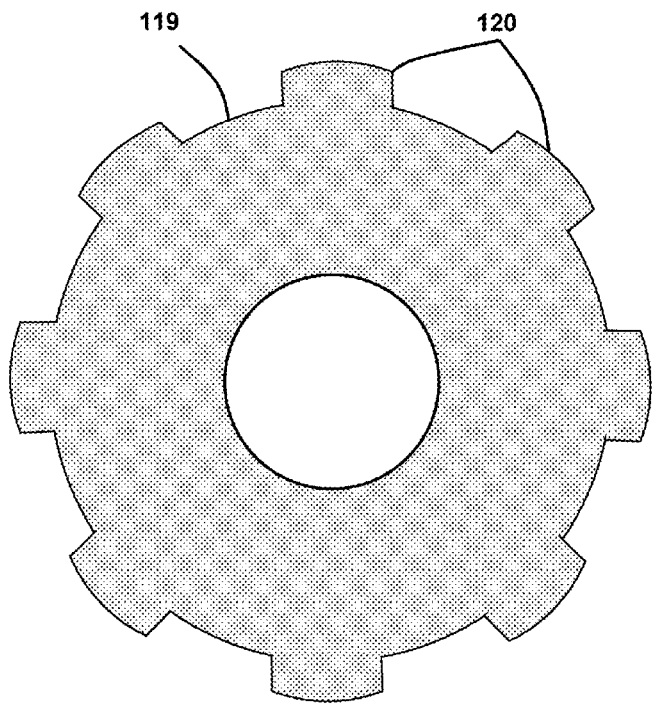
FIG. 9 illustrates a rotor of the type as would be utilized with the stator shown in FIGS. 1-8.

The laminated, salient pole rotor that is used with the Split-Pole Field-Match stator has salient poles which match the number of magnetic poles on the stator (in the case of the embodiment illustrated above, 8 poles) and each salient pole is sized and spaced so that it matches the face of a half-pole of each split-pole. Thus, there is a rotor pole to interact with every other half-pole alternately as the rotor rotates. Such a rotor is illustrated in FIG. 9, where laminated ferrite rotor 119 is shown with salient poles 120, which are eight (8) in number. Power take-off shaft center hole 121 is provided so the rotor 119 can be press fitted to a power take-off shaft.

The current to the motor can be supplied in different ways. In the preferred embodiment illustrated above, it is supplied by a single-phase inverter circuit which produces rectangular current waveforms with continuously variable frequency controlled by the speed of the motor by means of simple position sensors.

In the embodiment above, the AC coils are all connected into series with each other. The DC coils are all connected into series with each other and use a bridge circuit to rectify the quasi-sine wave from the inverter circuit into DC pulses which power the DC coils. These DC pulses are perfectly in synchronization with the AC pulses to the AC coils because they are from the same source and are simply bridge-rectified. A constant DC from an alternate power source can be used or a capacitor placed into the bridge circuit to make the pulse DC constant. This gives a different kind of motor response which can be "tuned" by adjusting the DC current for the desired performance. However, the pulse DC matches the AC stator coils almost automatically if the AC and DC coils have been properly matched which is usually that they have the same number of turns per coil and wound from the same size magnetic winding wire.

Figure 10:
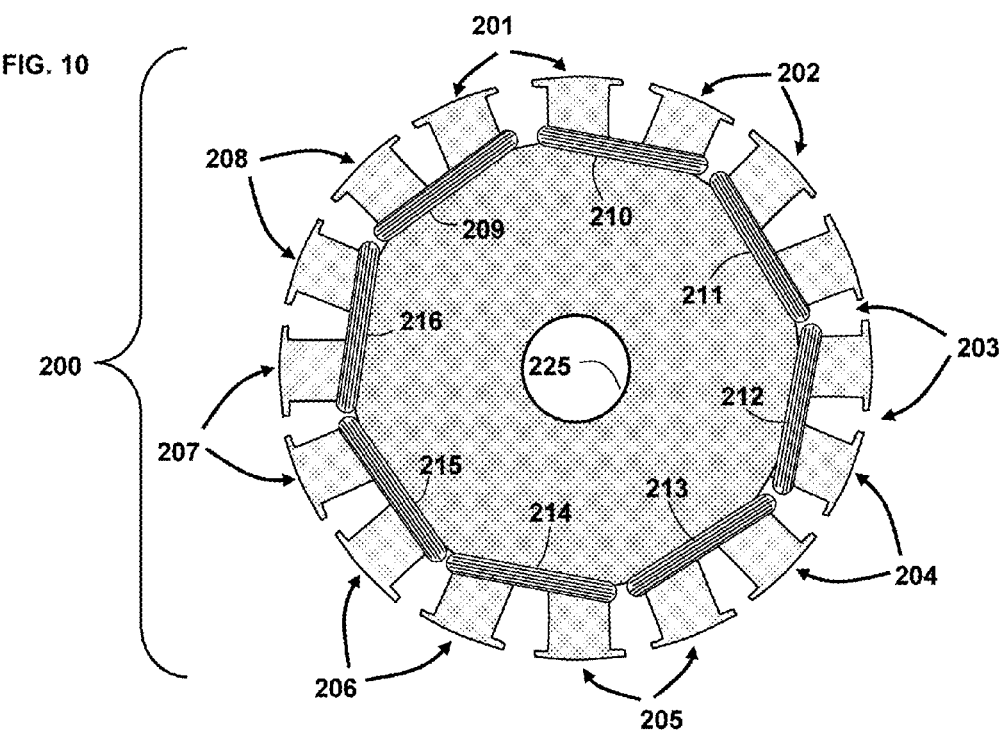
FIG. 10 is a schematic illustration utilizing the principles of the invention wherein rotor poles are wound in a manner equivalent to the stator poles.
Figure 11:
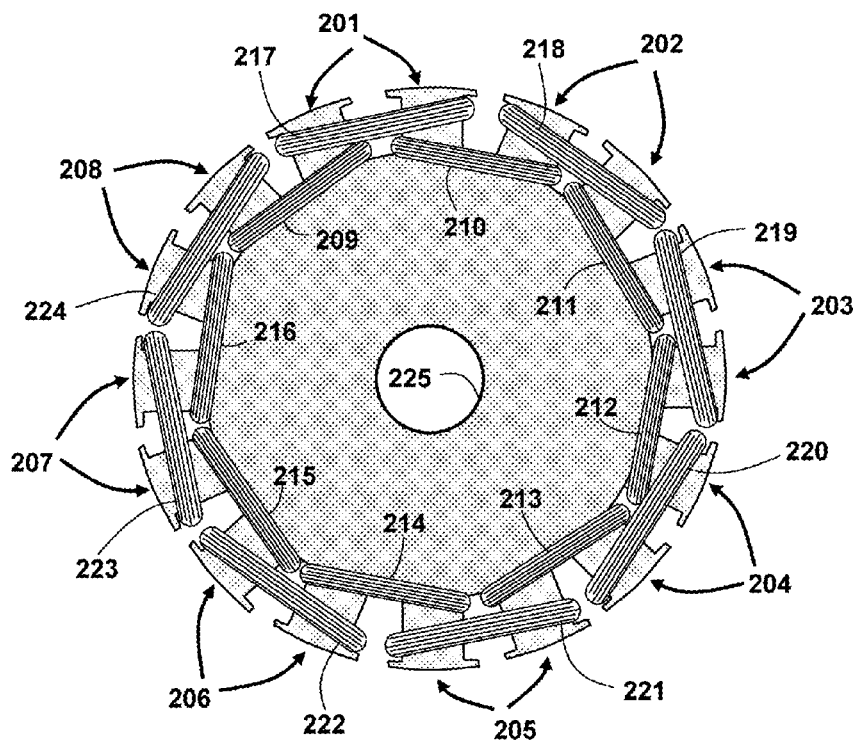
FIG. 11 is a schematic illustration showing the AC and DC coils located upon rotor poles in a manner equivalent to FIGS. 2-5 and 7.
Figure 12:
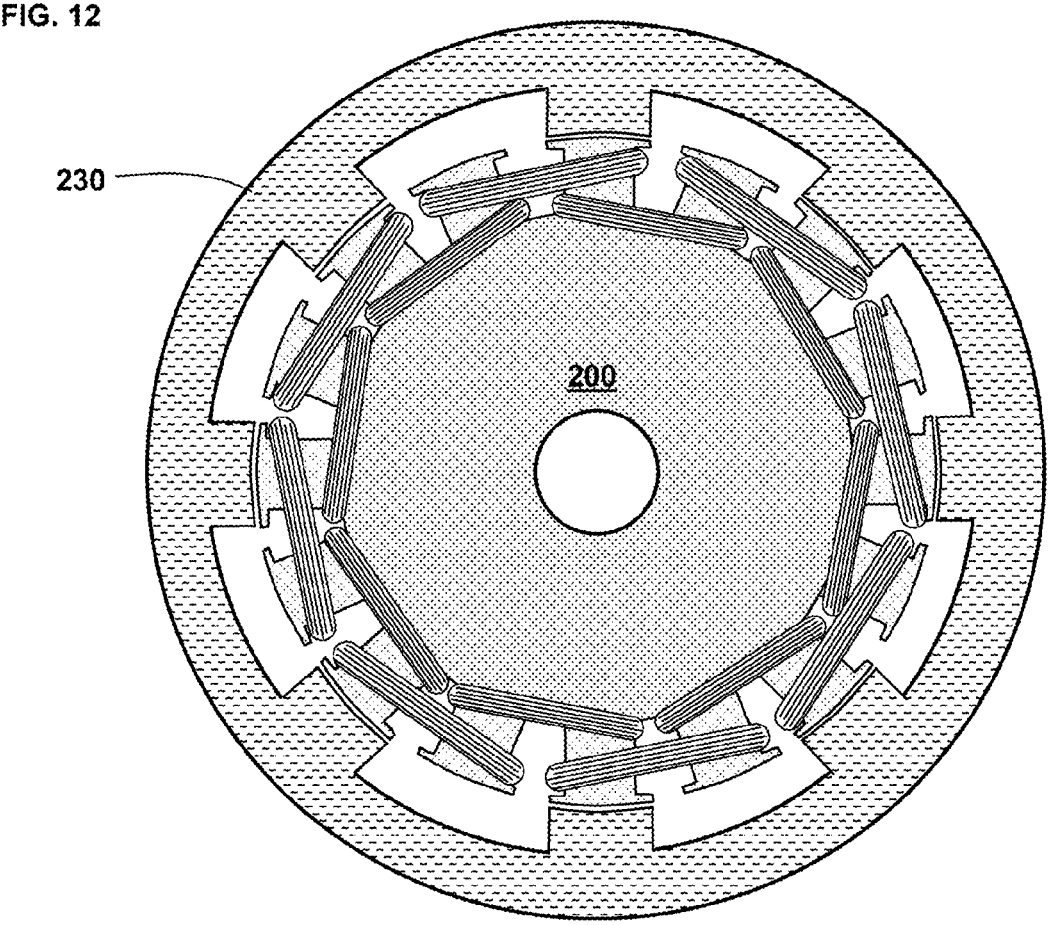
FIG. 12 is a schematic illustration of a transverse cross-section between an assembled motor rotor and stator wherein the rotor poles are wound as shown in FIG. 11.

In FIGS. 10-12, the concepts of the invention are shown wherein the rotor poles, rather than the stator poles are coil wound in the manner previously described. The inventive concepts and principles of motor operation are identical in the embodiments of FIGS. 10-12 as in the previously described embodiments. FIG. 10 illustrates the rotor at 200, and the rotor includes pairs of adjacent poles 201-208. In FIG. 10, these poles are wound in pairs of sets of coils 209-216. The coils 209-216 constitute bifilar wound DC coils, and the identical coils are oppositely connected to a DC circuit which alternately switches them so that they alternately induce oppositely oriented flux in their poles. The original single set (non-bifilar wound) DC coils are either put in parallel with these bipolar coils or series. The circuit which is used to control these configurations is shown in FIG. 13.

In FIG. 11, the coils 209-216 constitute AC coils, while the coils 217-224 are DC coils. The embodiment shown in FIG. 11 operates in the manner described in connection with FIGS. 1-9. The rotor 200 includes the central hole 225 for receiving the shaft, and as shown in FIG. 12, the stator 230 includes 8 poles for accommodating the 16 hole rotor having 8 sets of poles. The embodiment of FIG. 11 operates in the same manner as the embodiments of FIGS. 1-9.

Figure 13:
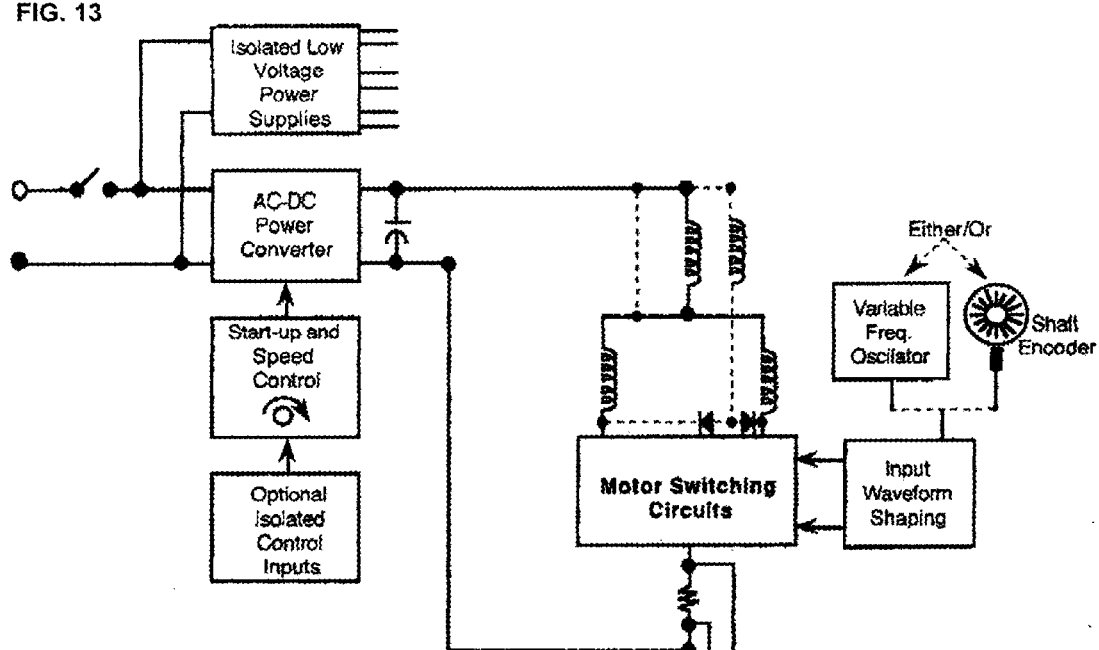
FIG. 13 illustrates the basic circuit used to control the motor of the invention if the AC coils are replaced by bifilar windings. The two resulting coils are connected oppositely to the DC switching and are triggered alternately so that they alternately induce the opposite flux field into the poles around which they are wrapped. This arrangement makes it possible to use a simpler DC circuit which lowers costs.

The circuit shown in FIG. 13 is used to control the pole wound configuration shown in FIG. 10. The various components of the circuit are illustrated by applied legends.

Figure 14:
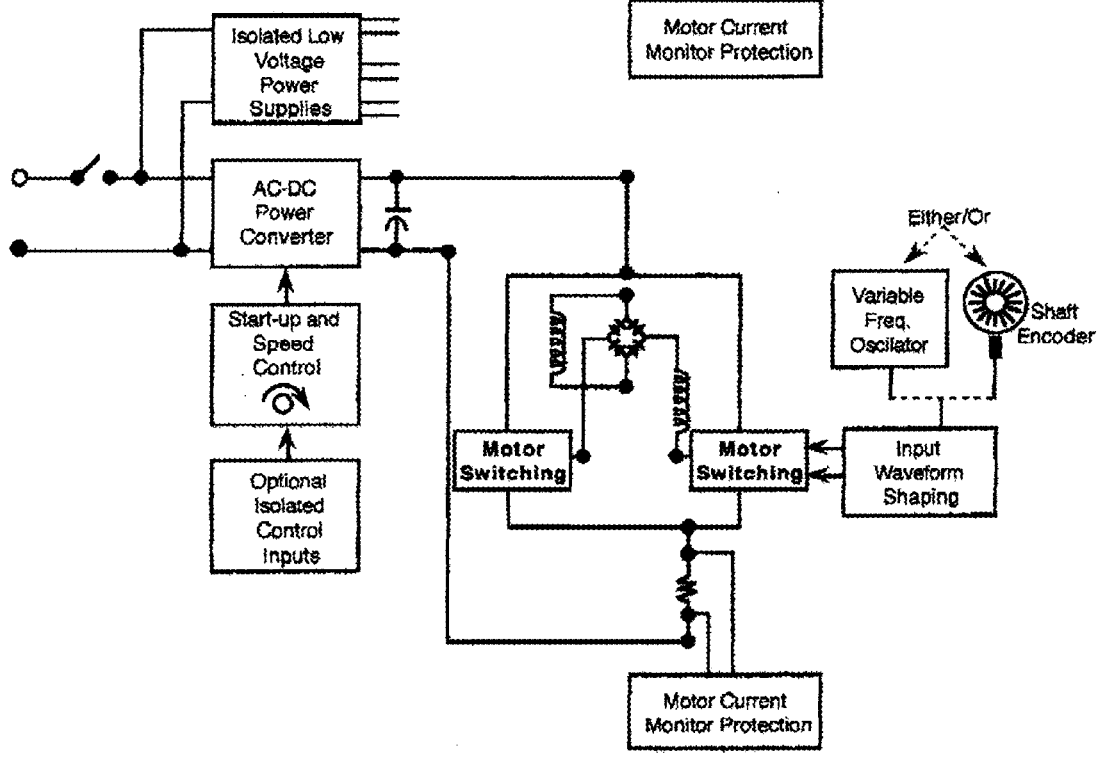
FIG. 14 illustrates the basic circuit design to control the motor of the invention if the AC coils are retained and used. In such instance, the circuit creates alternating voltage and current as desired and applies it to the AC coils and the DC coils. The DC coils, as shown, are connected through a full-wave bridge, and therefore, have DC pulses which are in phase with the AC pulses in the AC coils.

In FIG. 14, the circuit illustrated is that used to control the motor of FIGS. 1-9 and FIG. 11, wherein one set of DC coils and one set of AC coils are used with pairs of poles. The motor of the invention can run without a circuit from normal 120 volt alternating current. When the number of pole divisions are high in the stator and the pole widths are small, the motor of the invention will start itself under load without the need of circuit or starting coil. When the number of pole divisions is smaller and thus the pole widths are larger, a circuit or starting coil is used for poles to come into synchronization.

From the foregoing, it will be appreciated that salient poled rotor electric motors have a position wherein torque is substantially maximized, and a position wherein torque is substantially minimized. Thus, in embodiments of the present invention that will be discussed herein, the present invention provides a starting system and a method for starting salient poled electric motors, whereby the rotor may be moved from the minimum torque position to the maximum torque position, so that the motor may be started under load. It should be noted that although the Split-Pole Field Match Motor of the present invention is discussed in order to provide context for the starting system and method of the present invention, the general concepts illustrated are applicable to other salient-poled-rotor electric motors that have no coils or induction bands on the rotor, such as the Walter Motor.

FIG. 15 shows a linear illustration of a Split-Pole Field-Match Motor 300 according to the present invention wherein a rotor 320 is in the minimum starting torque position. The rotor 320 includes a plurality of spaced, salient poles, which are shown at rest in the register position with the left half-pole of each magnetic pole set 301-308 of the stator. Each magnetic pole set 301-308 of the stator has a DC field coil 314 that is charged in an unchanging polarity, wherein adjacent DC field coils 314 have opposite polarity. Adjacent half poles of the magnetic pole sets 301-308 of the stator have a stator armature coil or AC phase coil 315, wherein adjacent AC phase coils 315 have opposite polarity. By alternating the polarity of the AC phase coils 315, an alternating magnetic pole force is created in every other pole of the stator, thereby producing rotor torque. In the position shown in FIG. 15, the circuit feedback sensors charge the AC field coils 315 so that the flux in the AC field coils is magnetically out of phase with the magnetic flux produced by the DC field coils 314 in the left half-poles of each magnetic pole set 301-308 of the stator, which are in register with the rotor poles. However, the flux produced by the AC field coils 315 will be in-phase magnetically with the right hand half-poles of each magnetic pole set 301-308 of the stator, thus increasing the strength of the flux in those half-poles due to the series effect of the AC phase coils 315 and DC field coils 314 on those half-poles. Thus, the half-poles of the stator which are out of register with the rotor poles will exert an equal magnetic attraction on each rotor pole as illustrated by the magnetic flux field lines 330. Therefore, the potential torque in the desired direction is canceled by a near equal potential torque in the reverse direction as illustrated by the dashed arrowed lines 331, resulting in near zero torque on the rotor and load.

In FIG. 16, the maximum starting torque position is illustrated, wherein the poles of the rotor 320 are centered over the slots between the stator poles. As illustrated by the resulting force arrows 332 and the flux circuits 333, the desired rotation of the rotor is in the counter-clockwise direction. Accordingly, the drive sensors activate the AC phase coils 315 with the proper half-phase of current so that they will be in-phase magnetically with the flux from the stator DC field coils in the left half-pole of each stator magnetic pole set and thus out of phase magnetically with the flux from the stator field coils in the right half-pole of the each magnetic stator pole set. Thus, it can be appreciated that the position illustrated in FIG. 16 creates optimum starting torque in the counter-clockwise direction with no back-torque being created. This position is referred to herein as the mean focal torque position (MFTP), which is the maximum torque position for starting.

According to the starting system for salient-poled-rotor electric motors of the present invention, the stator coils of salient-poled-rotor electric motors serve as positioning coils for moving the rotor to MFTP. This is accomplished by providing appropriate frequency and current to the stator coils, as will be described in detail herein. In this manner, the starting system of the present invention allows salient-poled-rotor electric motors, such as the Split-Pole Field-Match Motor of the present invention and the Walter motor, to be started under load.

When run circuits are used with these motors, this positioning effect is created by providing a square wave signal from a square wave generator circuit to the inputs of drive circuit for the stator coils of the motor. For example, in the Split-Pole Field-Match motor, the square wave signal is provided to the H-bridge drive circuit, and in the Walter motor, the square wave signal is provided to the bifilar type drive circuit. The frequency is selected so that the two magnetic flux torque states of the stator poles are alternately excited. When the frequency of the square wave input is sufficiently high, the rotor pole faces are pulled equally by both sets of stator poles, and the pull is alternately applied at a frequency that vibrates the rotor. As the two opposite forces are alternately applied, the rotor vibrates to the MFTP, where both sets of stator poles have the same offsetting torque on the rotor poles. This position is the maximum torque position for the rotor in relation to the stator pole sets, as it is a position halfway between the two poles sets and thus centers the rotor pole faces on the slot between the two nearest poles from each set.

In order to achieve the MFTP, the frequency is set high enough to prevent the rotor from starting and running synchronously with the square-wave input, which can occur if an unloaded motor is supplied with a low frequency square-wave input. This means that the frequency needs to be high enough to prevent the mass of the rotor from moving into synchronous movement for even one tooth of rotation.

The force of the starting torque can be great (high current) if the frequency is high enough to accomplish this vibration effect just described. This provides a very strong centering effect which causes the rotor poles to move to the maximum torque position very quickly and with force sufficient to move the rotor against any load the motor could be expected to drive.

The frequency can also be made higher and lower above this vibration frequency in order to control the current, as to increase the frequency will result in the self-inductance and mutual inductance of the stator coils limiting the current flow. The increase of frequency thus lowers the power of the positioning effect due to the increased inductance of the stator coils limiting the current flow. The increase of frequency thus lowers the power of the positioning effect due to the increase inductance in the stator coils resulting in lower current and due to the greater hysteresis impact of the stator and rotor material at these higher frequencies.

When the frequency is decreased, the current increases, and the hysteresis effect decreases, creating greater positioning torque. Although a low frequency would be unacceptable if the load were absent due to the potential for synchronous movement, in the presence of a high load, reducing the frequency will allow the rotor to reposition with great force.

Figure 17:
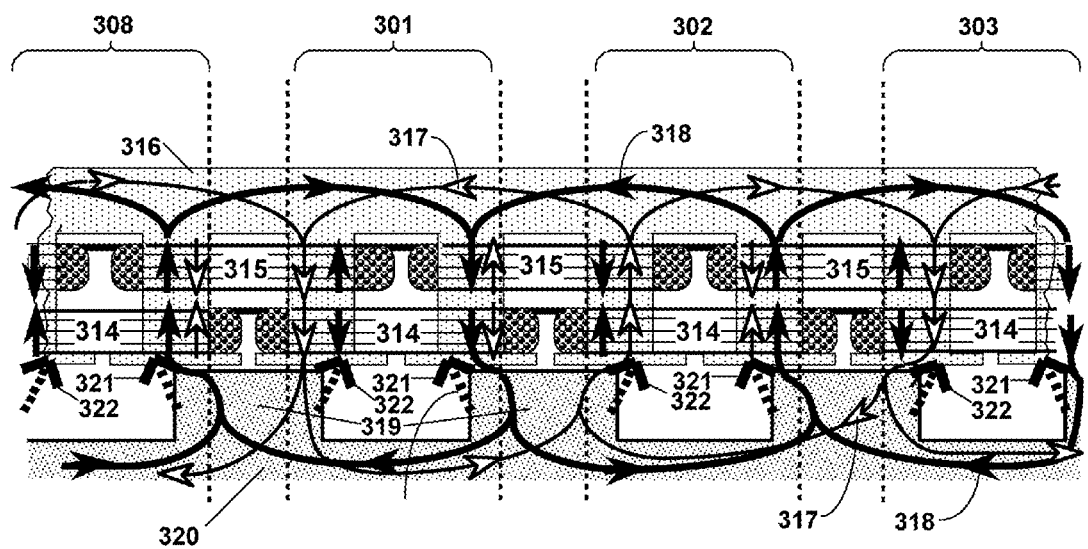
FIG. 17 is an illustration of the Split-Pole Field-Match motor depicting the magnetic flux circuits produced by the starting system of the present invention, wherein the rotor poles are positioned between magnetic poles of the stator.
Figure 18:
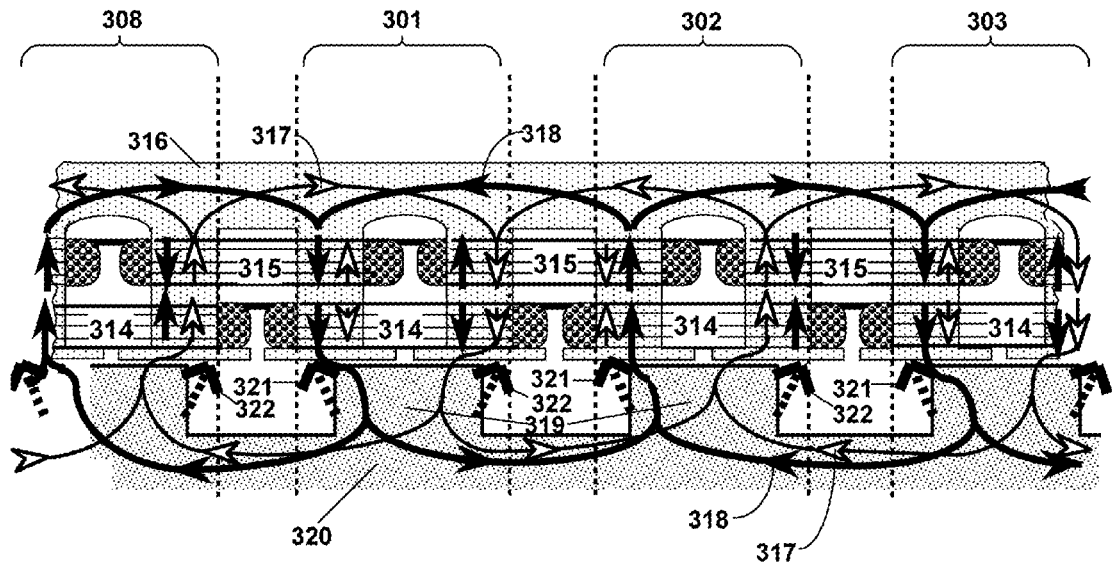
FIG. 18 is an illustration of the Split-Pole Field-Match motor depicting the magnetic flux circuits produced by the starting system of the present invention, wherein the rotor poles are positioned within a magnetic pole area of the stator.

As shown in FIG. 17, the flux circuits in the stator 316 and the rotor 320 that result from the interaction between the DC field coils 314 and the two half-phases of the single-phase AC phase coils 315 are indicated by the solid black arrows 318 and the white arrows 317. The black arrows 318 indicate the flux circuits resulting from the interaction of the DC field coils 314 and the AC phase coils 315 during the positive half-phase of the AC cycle. The white arrows 317 indicate the flux circuits resulting from the interaction of the DC field coils 314 and the AC phase coils 315 during the positive half-phase of the AC cycle. The AC current in the AC phase coils 315 is the result of a square wave generator (not shown) feeding a 105 Hz signal (which may vary according to the application) into the H-bridge circuit that controls the current to the motor (not shown). The DC coils 314 are in series with the AC coils 315 by means of a full-wave bridge rectifier (not shown) and thus receive the same pulses as the AC coils 315 except in rectified form. The negative half-phase flux circuits indicated by white arrows 317 create an attractive force which is indicated by dashed arrows 322, and the positive half-phase flux circuits indicated by black arrows 318 create an attractive force which is indicated by dotted arrows 321. At 105 Hz, the two torque forces on the rotor poles 319 offset each other and thus create the MFTP (mean focal torque position) which is located center of the slots between the pole sets 301-308. The forces that move the rotor 320 to the MFTP rotate the rotor poles 319 to one set or the other of these slot positions, which is every other slot of the stator 316. This can be a slot set within a magnetic pole set 301-308 or a slot between the magnetic pole sets 301-308 of stator 316. In FIG. 17, the flux circuits are illustrated if the rotor poles 319 move between magnetic poles of the stator, and in FIG. 18, the flux circuits are illustrated if the rotor poles 319 are torqued to the slot sets which are within a magnetic pole area of the stator 316. In either position, attention given to how the flux circuits indicated by white arrows 317 and black arrows 318 interact with the rotor poles 319 of the rotor 320 gives a clear understanding of how the MFTP is created and how the rotor poles 319 are induced to torque to the center of the MFTP by the alternating forces indicated by the dotted arrows 321 and dashed arrows 322.

Figure 19:
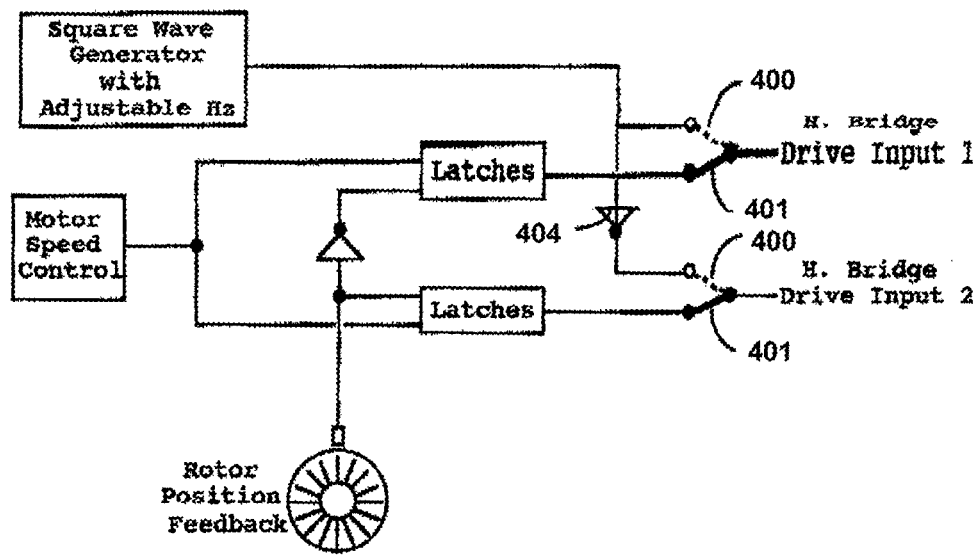
FIG. 19 is a block diagram showing an adjustable square wave generator connected to an H-bridge drive circuit.
Figure 20:
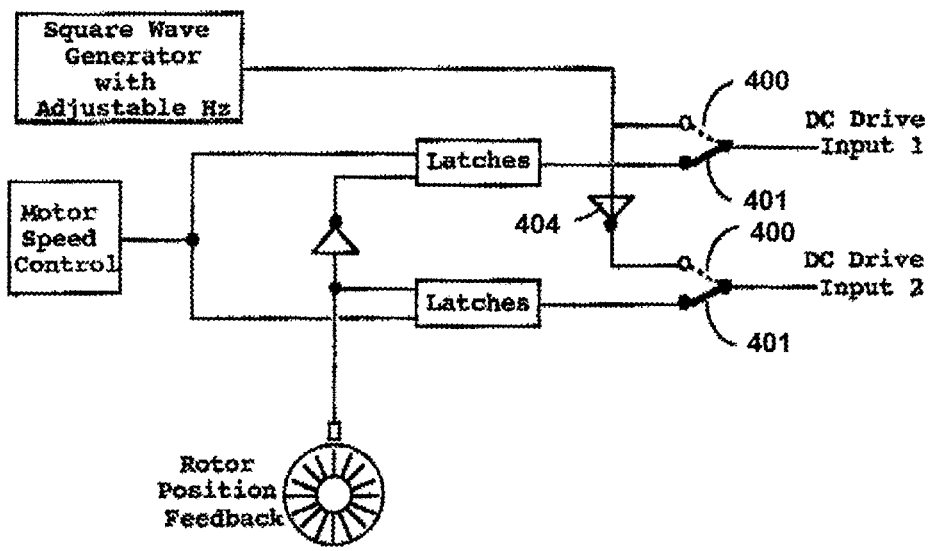
FIG. 20 is a block diagram showing an adjustable square wave generator connected to a bifilar drive circuit.

FIGS. 19-20 show drive circuits for salient-poled rotor electric motors having rotor positioning circuits. FIG. 19 shows an H-bridge circuit having rotor position feedback and speed control, as may be used with the Split-Pole Field-Match motor, connected to an adjustable square wave generator. The adjustable square wave generator is connected to the two drive inputs of the circuit so that the inverter 404 is between the square wave generator and the second drive input to provide alternate triggering of the first and second drive inputs. Dashed lines 400 indicate start connections, which are momentarily connected to the drive inputs when the motor is started. About two milliseconds is usually enough to accomplish rotor pole positioning, and then the start connections indicated by dashed lines 400 would be opened, and the run connections 401 would then be closed. It should be understood that the start connections indicated by dashed lines 400 and the run connections 401 are never both closed at the same time.

FIG. 20 shows an adjustable square wave generator connected to a bifilar circuit, as may be used with the Walter Motor. The square wave generator signal is provided to the DC drive inputs, which control the armature coils of the motor. The momentary start connection 402 is indicated with dashed lines, and the run connection 403 is illustrated with solid lines. As described in connection with the H-bridge circuit shown in FIG. 19, the inverter 404 is used between the generator signal and second drive input to provide alternate triggering of the first and second drive inputs.

In another embodiment, the present invention provides a starting system for salient-poled-rotor electric motors which run synchronously from AC wall current. Such motors will only start if there is a proper ratio of rotor poles in relation to rotor circumference. Where a rotor has a high number of pole divisions thus allowing the mass of the rotor to be accelerated into sync with the wall current frequency, the mass of the rotor need move only a short distance to complete one pole register cycle with the stator poles. However, when there is a large starting load, the motor will need to overcome two problems to start. The first problem is the possibility that the rotor may be positioned so that it has little to no ability to create torque between the rotor poles and the stator poles in the direction of desired rotation because of the back-torque. Thus, the rotor may only vibrate. The second problem, assuming that maximum torque is available, occurs when the load on the rotor is too high to allow the rotor to be accelerated into synchronous relation with the torque flux caused by the AC wall current being applied at either 60 Hz or 50 Hz (unless, of course, the pole divisions are very high in relation to the diameter of the rotor).

In the case where a synchronous motor must be started under load, an alternative embodiment of the present invention provides a simple start circuit that utilizes the existing coils to create the MFTP and bring the rotor into a synchronous relationship with the torque flux from the stator poles.

In this embodiment, there is no run circuit, but rather, a simple start circuit is created by using a rotor feedback circuit and a triac, which is a controlled semiconductor. The square wave generator used to create the MFTP in the previous versions for rotor positioning is not used because there are no circuit inputs into which to feed a square wave signal and no DC link current to control. Thus, the MFTP is created using alternating current (AC) and the simple start circuit just mentioned. In order to properly understand this system, we will first describe the starting system as used and then digress to how we create the MFTP using that system.

Figure 21:
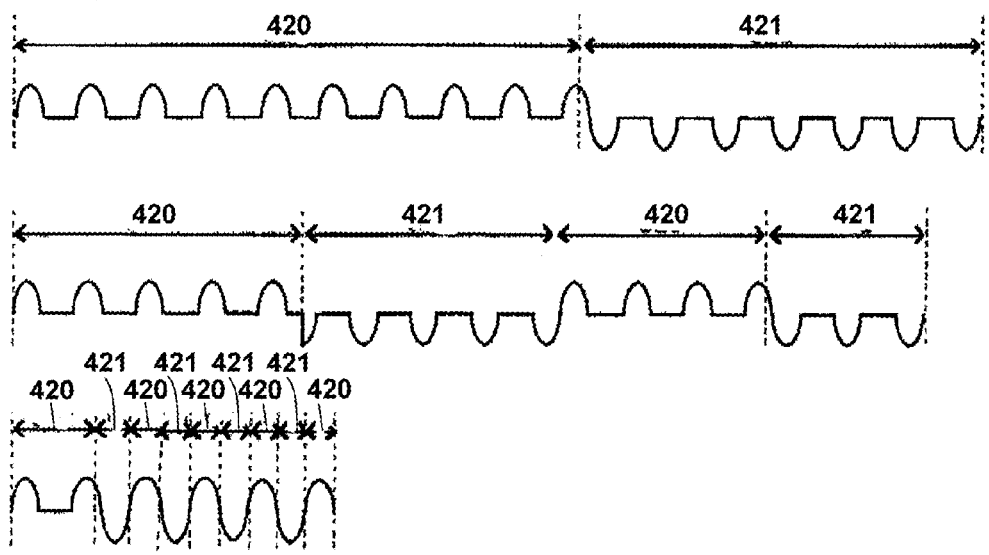
FIG. 21 is an illustration showing a wave form showing the output of the synchronous running motor start system of the present invention during positive and negative enablement periods of the rotor position circuit.

A triac is connected between the motor and the AC power supply and is controlled by a simple rotor position sensor circuit. The rotor position sensor circuit causes the triac to pass the positive half of the AC current to the motor coils when the rotor needs positive current, and the rotor position sensor circuit causes the triac to pass the negative half of the AC current to motor coils when the rotor needs negative current. Consequently, this system acts as a start circuit control that progressively takes the rotor from rest to synchronous rotation with the flux created in the stator by the AC current. In FIG. 21, a representation of how this works is illustrated by showing positive enablement periods 420 and negative enablement periods 421 of the rotor position circuit controlling the triac. When the rotor is at rest in a position which would call for a positive waveform, as in the first and largest area marked 420, the triac will only allow positive current to pass through the motor coils. As can be seen, pulses of positive current will continue to pass through the motor at wall current frequency until the rotor is induced to move. This half-wave application of current also helps prevent the start current from rising too high. When the rotor is torqued forward, the rotor position circuit will now reverse the biasing of the triac as indicated by the dashed line between this first positive enablement period 420 and the following negative enablement period 421. If a positive current wave is already in process when the control circuit changes the bias, it will continue until it self-terminates. This is due to the fact that a triac will not turn off until the current stops after it has been triggered in a certain direction. However, as soon as that one positive wave is complete, the triac will now allow only negative current waves to pass through the motor coils and, as illustrated in the negative enablement period 421, negative pulses will continue to act on the rotor through the stator coils until the rotor moves once again. As the rotor now has some momentum, it will take less time for the rotor to move through this position as indicated by the shorter length of the negative enablement period 421. As can be seen by following the indicated sequence all the way through FIG. 21, this process will continue with each triggering period becoming shorter and shorter as the rotor accelerates thus allowing fewer and fewer current pulses, either positive or negative, until synchronous rotation is achieved where there is only one current wave in each area. When synchronous rotation is reached, the circuit is still active, but has little to no effect on the motor, which will run as if the circuit were not present. However, should the load cause the rotor to drop out of sync, the circuit will control the pulses in the same manner and bring the rotor back into sync, provided that the voltage and current available to the motor are adequate.

By another embodiment, the starting system of the present invention creates the MFTP in the Split-Pole Field-Match motor by passing DC current through the stator DC field coils. Using this start circuit, it is possible to simply bypass the stator AC phase coils in the motor and allow the wall current, which is controlled by the triac, to pass around the AC coils and then into the full-wave bridge of the Split-Pole Field-Match motor system, and then through the stator DC field coils. Although the triac passes either the positive or negative half phase of the alternating current depending upon the position of the rotor, the alternating current is rectified by the full-wave bridge so that the rectified direct current passes through the stator field coils in a constant direction. However, because the triac passes only a half-phase of the alternating current, the rectified direct current in the DC stator field coils is a 0.5 dt pulse. The pulsing current provided to the DC stator field coils vibrates the rotor, which is ideal for moving the rotor, while at the same time controlling the amount of current which passes through the stator field coils.

Figure 22:
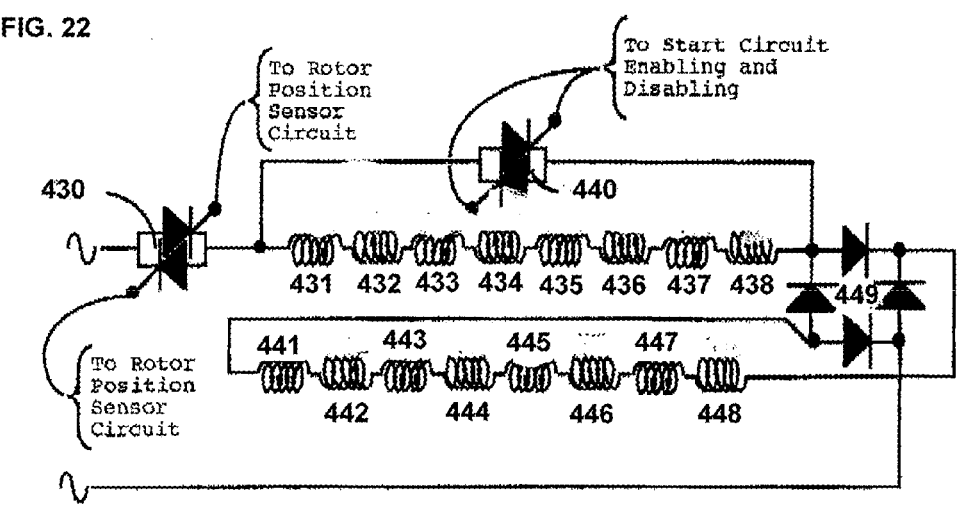
FIG. 22 is an illustration showing the starting circuit of the synchronous running motor start system of the present invention.

FIG. 22 shows the starting circuit previously described and the bypass circuit which allows the momentary rotor positioning. The triac control circuit 430, which is controlled by the rotor position sensor circuit (not shown), is shown connected to the AC wall current and then to the motor AC stator coils 431-438, which are connected to one of the AC terminals of the full-wave bridge 449. The DC terminals of the full-wave bridge 449 are connected to the DC stator field coils 441-448, and the other AC terminal of the bridge 449 is connected back to the other side of the AC wall current. This is the basic start circuit, and this circuit can also be used without the positioning effect to start and run synchronously running AC motors which do not need this positioning effect. However, also pictured in FIG. 22 is triac 440 which has its gates connected to the start circuit enable and disable (not shown). The triac 440 is connected to opposite ends of the AC stator coils 431-438. When the triac 440 is enabled, either positive or negative AC pulses can pass around the stator AC coils into the bridge 449, thus creating the MFTP effect on the rotor due to the pulse DC in the stator field coils. Triac 440 is enabled only momentarily (usually about 2 milliseconds) and then is disabled, so that the start circuit can then operate as previously described in relation to FIG. 21.

In some applications, large numbers of windings are provided to facilitate efficient motor operation. However, the resulting inductance will not allow enough current to pass through the coils to accelerate the load properly. In order to create adequate starting torque for such motors, center taps are provided on all of the stator coils. When center taps are used, some of the windings of the motor coils are dropped from the circuit momentarily to allow the motor to achieve synchronous speed. Once synchronous speed is reached, a switch, such as a common centrifugal switch, changes the connection back to the run connection, which utilizes all of the stator coil turns.

Figure 23:
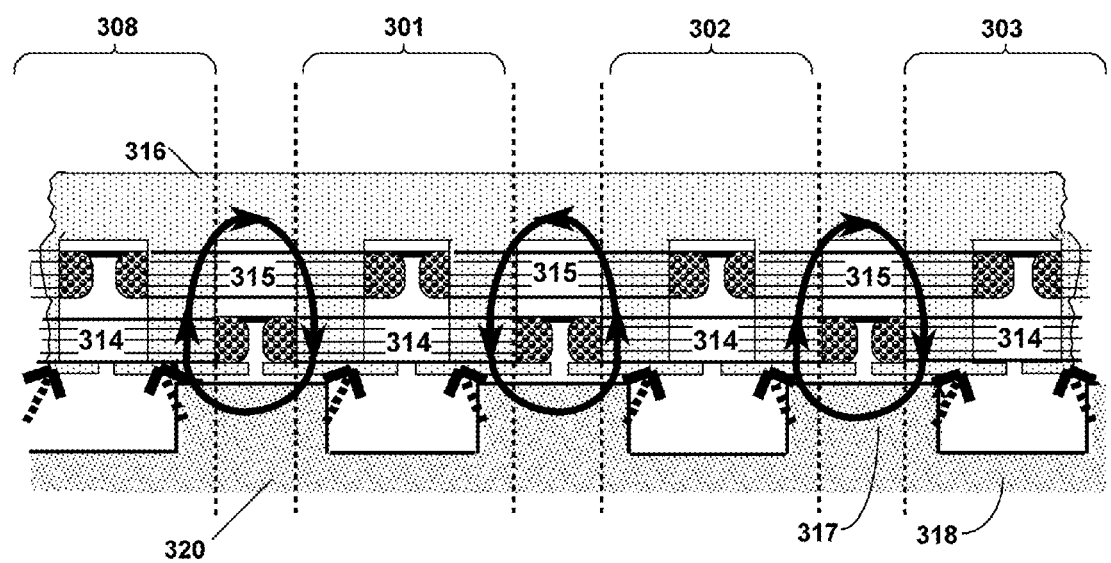
FIG. 23 is an illustration of the Split-Pole Field-Match motor showing the flux circuits set up by the synchronous running motor start system wherein the rotor poles are positioned in between magnetic poles of the stator.
Figure 24:
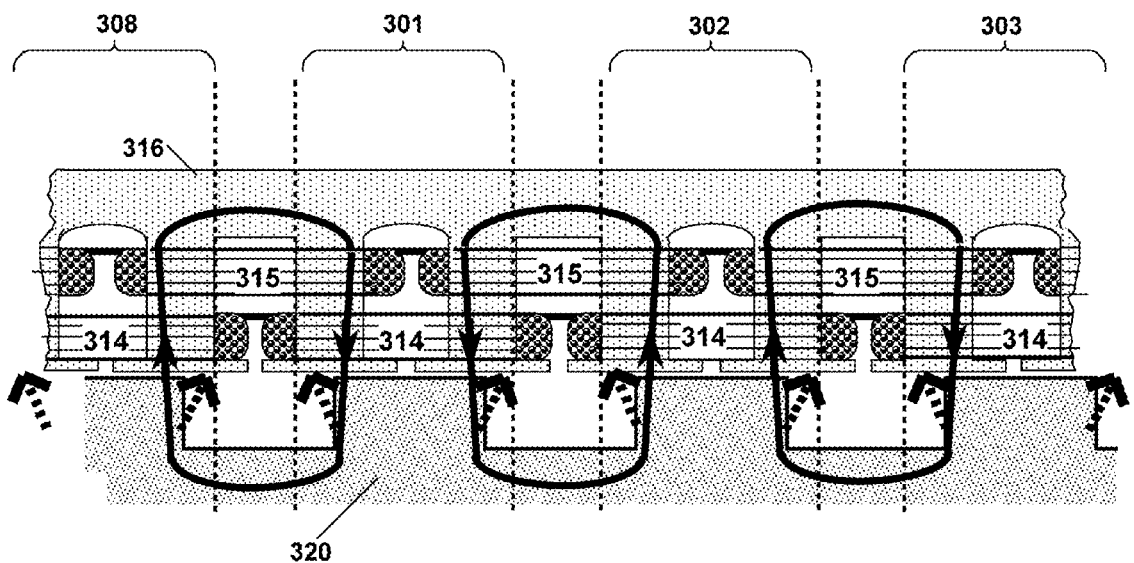
FIG. 24 is an illustration of the Split-Pole Field-Match motor showing the flux circuits set up by the synchronous running motor start system wherein the rotor poles are positioned within a magnetic pole of the stator.

In order to create the MFTP with the stator DC field coils 314, the AC coils are bypassed, and the DC field coils 314 are powered with half-wave current, thereby setting up magnetic flux circuits and torque forces as shown in FIGS. 23-24. FIG. 23 illustrates the flux circuits and torque forces if the rotor poles are attracted in between magnetic poles of the stator, and the arrowed lines indicate the flux paths while the dashed arrows indicate the torque forces acting on the rotor poles of rotor 320. Since there is no current applied to the stator AC phase (armature) coils 315, the arrows of the flux lines are placed to indicate that the flux originates within the coils 314. FIG. 24 illustrates the flux circuits if the rotor poles are attracted within a stator magnetic pole, and the arrowed lines indicate the flux paths while the dashed arrows indicate the torque forces acting on the rotor poles of the rotor 320. As can be appreciated by these two FIGS. 23-24, both possible flux circuits in the stator 316 and the rotor 320 will move the rotor poles so the face of the poles are centered over a slot of the stator poles, which means that the rotor will now be repositioned into the maximum torque position and prepared for starting.

In addition to this being used as a start positioning circuit, it can equally be used as a rotor/load brake on the rotor when rotor braking is desired. If the momentarily start positioning circuit is activated when the motor is running, the DC coils will start to create a back torque on the rotor poles. Additionally, although no current is applied to the AC coils, they will act as generators, due to the flux induced into them by the moving rotor poles, thereby slowing the rotor. Since the AC coils are connected back to themselves through the bypass circuit triac, as shown in FIG. 22, but equally serves to shunt them to themselves if any potential current is induced into them, the induced current is able to flow into these coils, and a further load is created on the rotor which helps to quickly decelerate the rotor and its load.

It is appreciated that various modifications to the inventive concepts may be apparent to those skilled in the art without departing from the spirit and scope of the invention.

What is claimed is:

1. A starting system for a salient-poled-rotor electric motor having a stator with a plurality of spaced salient poles, a plurality of field coils of unchanging polarity, and a plurality of armature coils, wherein each field coil of said plurality of field coils at least partially overlaps an armature coil of said plurality of armature coils, and wherein variable excitement of said armature coils alternately creates a magnetic pole force in every other pole of said plurality of spaced salient poles of said stator, and wherein said stator has a first position, wherein said rotor is in stasis with respect to said stator and torque between said rotor and said stator is substantially minimized, and a second position, wherein torque between said rotor and said stator is substantially maximized, comprising:
   a drive circuit for providing current to said field coils and said armature coils;
   a start circuit for regulating said drive circuit by vibrating said rotor to said second position;
   a current source connectable to said drive circuit for variable excitation of said armature coils to produce substantially continuous rotation of said rotor; and
   a switch for electrically engaging said start circuit with said drive circuit while said rotor moves from said first position to said second position, and for electrically engaging said current source with said drive circuit when said rotor reaches said second position.

2. The starting system stated in claim 1, further comprising:
   said start circuit having an adjustable square wave generator for generating a series of pulses to regulate said drive circuit.

3. The starting system stated in claim 2, wherein said drive circuit comprises an H-bridge type drive circuit.

4. The starting system stated in claim 2, wherein said drive circuit comprises a bifilar type drive circuit.

5. The starting system stated in claim 1, further comprising:
   said start circuit having a rotor position sensor for sensing a first condition of said rotor and a second condition of said rotor; and
   said start circuit having a triac electrically connected to said position sensor for generating a series of pulses to regulate said drive circuit, said series of pulses formed from the positive half phase of an alternating current source in response to said first condition of said rotor, and said series of pulses formed from the negative half-phase of said alternating current source in response to said second condition of said rotor.

6. The starting system stated in claim 1, further comprising:
   said start circuit electrically engageable with said drive circuit for bypassing said armature coils.

7. The starting system stated in claim 1, further comprising:
   said drive circuit having a triac which passes substantially unchanged alternating current to said armature coils when said rotor reaches synchronous operation.

8. The starting system stated in claim 1, further comprising:
   said start circuit bypasses said armature coils; and
   said series of pulses generated by rectifying alternating current.

9. A method for starting a salient-poled-rotor electric motor, comprising:
   providing a motor having a stator with a plurality of spaced, salient stator poles and a rotor with a plurality of spaced salient rotor poles, each said rotor pole having a first position with respect to each said stator pole wherein torque is substantially minimized, and each said rotor pole having a second position with respect to each said stator pole, wherein torque is substantially maximized;
   generating a series of pulses to vibrate said rotor poles from said first position to said second position, the series of pulses including at least two successive pulses of equal polarity; and
   providing current to said motor to produce substantially continuous rotation of said rotor after said rotor reaches a said second position.

10. The method stated in claim 9, further comprising:
    providing a square wave generator for performing the step of generating said series of pulses.

11. The method stated in claim 9, further comprising:
    providing a triac for performing the step of generating said series of pulses.

12. The method stated in claim 9, further comprising:
    providing a triac and a rectifier for performing the step of generating said series of pulses.

13. A method for starting a salient-poled-rotor electric motor having a stator with a plurality of spaced salient poles, a plurality of field coils of unchanging polarity, and a plurality of armature coils, wherein each field coil of said plurality of field coils at least partially overlaps an armature coil of said plurality of armature coils, and wherein variable excitement of said armature coils alternately creates a magnetic pole force in every other pole of said plurality of spaced salient poles of said stator, and wherein said stator has a first position, wherein said rotor is in stasis with respect to said stator, and torque between said rotor and said stator is substantially minimized, and a second position, wherein torque between said rotor and said stator is substantially maximized, the method comprising:
    providing a drive circuit for providing current to said field coils and said armature coils;
    electrically engaging a start circuit with said drive circuit when said rotor is in said first position;
    generating a series of pulses with said start circuit to vibrate said rotor toward said second position;
    electrically disengaging said start circuit when said rotor reaches said second position;

providing current to said drive circuit for variable excitation of said armature coils to produce substantially continuous rotation of said rotor after said rotor reaches said second position.

14. The method stated in claim 9, further comprising:
said start circuit having an adjustable square wave generator for generating said series of pulses to regulate said drive circuit.

15. The method stated in claim 9, wherein said drive circuit is an H-bridge type drive circuit.

16. The method stated in claim 9, wherein said drive circuit is a bifilar type drive circuit.

17. The method stated in claim 9, further comprising:
sensing the position of said rotor for sensing a first condition of said rotor and a second condition of said rotor; and
generating said series of pulses by passing the positive half phase of an alternating current source in response to said first condition of said rotor, and by passing the negative half-phase of said alternating current source in response to said second condition of said rotor.

18. The method stated in claim 9, further comprising:
said start circuit electrically engageable with said drive circuit for bypassing said armature coils.

19. The method stated in claim 9, wherein said drive circuit comprises a triac which passes substantially unchanged alternating current to said armature coils when said rotor reaches synchronous operation.

20. The method stated in claim 9, further comprising:
said start circuit bypasses said armature coils; and
said series of pulses generated by rectifying alternating current.

21. The method stated in claim 9, wherein the series of pulses includes at least two successive alternating current half-wave pulses.

22. The method stated in claim 9, wherein the series of pulses includes alternating positive pulse sets and negative pulses sets, each positive pulse set having two or more successive positive alternating current half-wave pulses and each negative pulse set having two or more successive negative alternating current half-wave pulses.

23. A starting system for a salient-poled-rotor electric motor having a stator with a plurality of spaced salient poles, a plurality of field coils of unchanging polarity, and a plurality of armature coils, wherein each field coil of said plurality of field coils at least partially overlaps an armature coil of said plurality of armature coils, and wherein variable excitement of said armature coils alternately creates a magnetic pole force in every other pole of said plurality of spaced salient poles of said stator, and wherein said stator has a first position, wherein said rotor is in stasis with respect to said stator and torque between said rotor and said stator is substantially minimized, and a second position, wherein torque between said rotor and said stator is substantially maximized, comprising:
a drive circuit for providing current to said field coils and said armature coils;
a start circuit for regulating said drive circuit by moving said rotor to said second position when said rotor is in a stopped condition;
a current source connectable to said drive circuit for variable excitation of said armature coils to produce substantially continuous rotation of said rotor; and
a switch for electrically engaging said start circuit with said drive circuit while said rotor moves toward said second position, and for electrically engaging said current source with said drive circuit when said rotor reaches said second position.

\* \* \* \* \*